United States Patent [19]

Hashimoto et al.

[11] Patent Number: 4,630,235

[45] Date of Patent: Dec. 16, 1986

[54] KEY-WORD RETRIEVAL ELECTRONIC TRANSLATOR

[75] Inventors: Shintaro Hashimoto, Ikoma; Masafumi Morimoto, Yamatokoriyama; Shigenobu Yanagiuchi, Tenri; Hidehiko Yamamoto, Yamatokoriyama, all of Japan

[73] Assignee: Sharp Kabushiki Kaisha, Osaka, Japan

[21] Appl. No.: 829,473

[22] Filed: Feb. 13, 1986

Related U.S. Application Data

[63] Continuation of Ser. No. 630,356, Jul. 16, 1984, abandoned, which is a continuation of Ser. No. 357,090, Mar. 11, 1982, abandoned.

[30] Foreign Application Priority Data

Mar. 13, 1981 [JP] Japan .................................. 56-37408

[51] Int. Cl.$^4$ ................................. G06F 15/14
[52] U.S. Cl. .................................... 364/900
[58] Field of Search ... 364/200 MS File, 900 MS File

[56] References Cited

U.S. PATENT DOCUMENTS 4,481,607 11/1984 Kobayashi et al. ................. 364/900
4,503,426 3/1985 Mikulski ............................. 364/900

FOREIGN PATENT DOCUMENTS 2014765 8/1979 United Kingdom ................. 364/900

OTHER PUBLICATIONS

Lexis Handbook, Mead Data Central, 1980.

*Primary Examiner*—Gareth D. Shaw
*Assistant Examiner*—Daniel K. Dorsey
*Attorney, Agent, or Firm*—Birch, Stewart, Kolasch & Birch

[57] ABSTRACT

An electronic translator is featured in which a particular sentence, phrase or idiom is accessed from a memory utilizing at least two key words. The key words are contained with the particular sentence, phrase or idiom. The translator is adapted to identify that a sentence, phrase or idiom stored in the translator contains one of the key words each time one of the key words is inputted.

6 Claims, 8 Drawing Figures

KEY-WORD RETRIEVAL ELECTRONIC TRANSLATOR

This application is a continuation of application Ser. No. 630,356 filed on July 16, 1984, now abandoned which in turn is a continuation of application Ser. No. 357,090, filed on Mar. 11, 1982, now abandoned.

BACKGROUND OF THE INVENTION

The present invention generally relates to a word information storage and retrieval device, and more particularly to an electronic translator for providing efficient and rapid retrieval of any desired words or sentences stored therein.

Recently, electronic devices called electronic translators have become available on the market. The electronic translators require efficient and rapid retrieval of word information stored in a memory.

For this purpose, conventionally, a phrase, an idiom, or a sentence stored in the memory is retrieved by reference to one or more words that are contained within one or more of the phrases, idioms and sentences. The one or more words used for retrieving the desired phrase, idiom or sentence are called key words.

This retrieval operation utilizing a key word or words is called a key-word retrieval operation. In such a case, it is preferable that the operator be sure that the memory includes the phrase, idiom or sentence containing the key word or words that he or she wishes retrieved.

This is because, when any words different from the designated key words are erroneously inputted in an attempt to retrieve the desired phrase, idiom or sentence, the key-word retrieval operation can not be accomplished rapidly and efficiently.

Therefore, it has been desirable to confirm whether the memory includes the phrase, idiom or sentence containing one or more of the key words inputted.

This confirmation is needed particularly when the number of the key words is two or more because the introduction of the two or more key words requires a time significantly longer than that when a single key word is used.

Conventionally, when the two or more key words are used to retrieve the phrase, etc., the electronic translator is not capable of detecting whether there is the memory includes a phrase or the like containing every of the key words simultaneously when each of the key words is inputted. This is, the key-word retrieval operation is conducted only after all of the key words are inputted. Even if it is evident that the memory does not contain a phrase, idiom or sentence containing the first key word, a second or more key words must first be inputted by the user since he does not know that no phrase, idiom or sentence containing the first key word is found in the memory. Hence, the input of the second key word and the time to do so can not be avoided.

SUMMARY OF THE INVENTION

Accordingly, it is an object of the present invention to provide an improved electronic translator for retrieving phrases, idioms and sentences with reference to two or more key words that are contained there in which includes means for detecting whether there is included in the memory one or more phrases, idioms and sentences containing the key words inputted.

It is another object of the present invention to provide an improved electronic translator that is capable of detecting whether the memory includes one or more phrases, idioms and sentences containing each of two or more key words concurrent to the input of of each of them.

Briefly described, in accordance with the present invention, an improved electronic translator is provided wherein words of a certain arrangement are retrieved by selecting at least two key words that are contained in the arrangement of words comprising input means for entering the at least two key words, memory means for storing a plurality of arrangements of words, at least one of the arrangements of words containing the at least two key words, access means responsive to the input means for accessing the arrangements of words containing at least two key words, in the memory means, and termination means actuated by the input for indicating that the input of each of the at least two key words is terminated, the termination means causing the access means to be operated at once to identify that each of the at least two key words is found in at least one of the arrangements of words.

According to the invention, the initial key word is a first key word in two or more key words, so that the access means is operated at the time when only the first key word is inputted, before a second key word is inputted.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

First of all, any language can be applied to an electronic translator of the present invention. An input word is spelled in a specific language to obtain an equivalent word, or a translated word spelled in a different language corresponding thereto. The languages can be selected freely.

Figure 1:
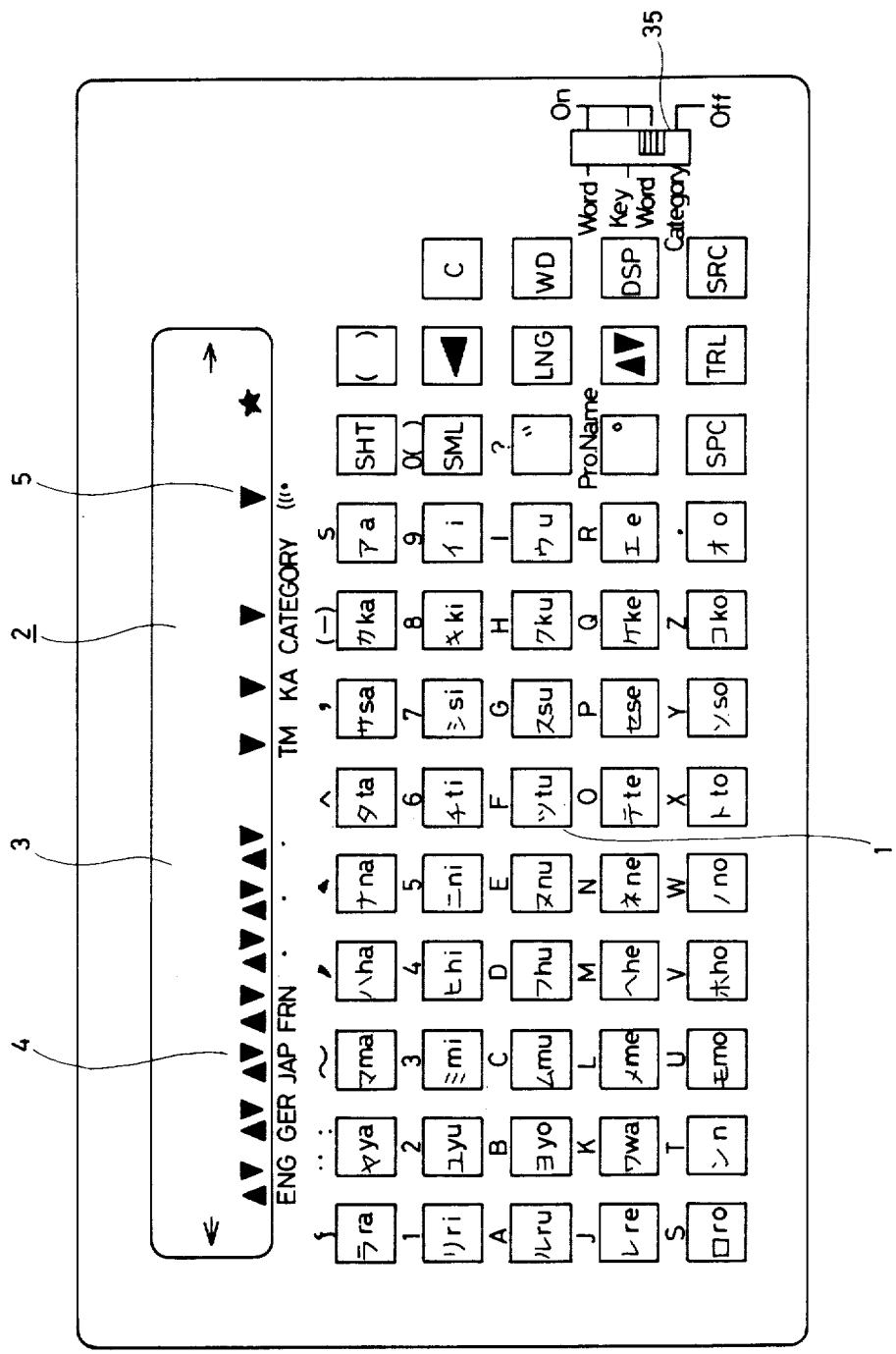
FIG. 1 shows a plan view of an electronic translator according to the present invention.

Referring now to FIG. 1, there is illustrated an electronic translator according to the present invention. The translator comprises a keyboard 1 containing a Japanese syllabary keyboard, an alphabetical keyboard, a symbol keyboard, and a functional keyboard, an indicator 2 including a character indicator 3, a language indicator 4 and a symbol indicator 5.

The character indicator 3 shows characters processed by this translator. The language indicator 4 shows symbols used for representing the kind of the mother language and the foreign language then being processed by the translator. The symbol indicator 5 shows symbols used for indicating operating conditions in this translator.

The symbol indicator 5 includes symbols illuminated to indicate the selection of a multivocal word, represented by TM, the selection of a Japanese "Katakana" letter, represented by KA, the selection of categories, and the selection of an audible information output.

A mode selector switch 35 is provided for selecting modes of word selection ("Word"), key-word retrieval ("Key Word") and word category selection ("Category"), respectively, in all of which cases the translator is powered. The selector switch 35 can be operated also to turn off the power. As a function key switch, a clear key switch "C" is provided for cancelling word/sentence information. Further, a search key referenced as "SRC" is provided for continually retrieving words and sentences. A word key referred to "WD" is provided. A translation key "TRL" is provided for translating the words and the sentences into the selected foreign language.

Figure 2:
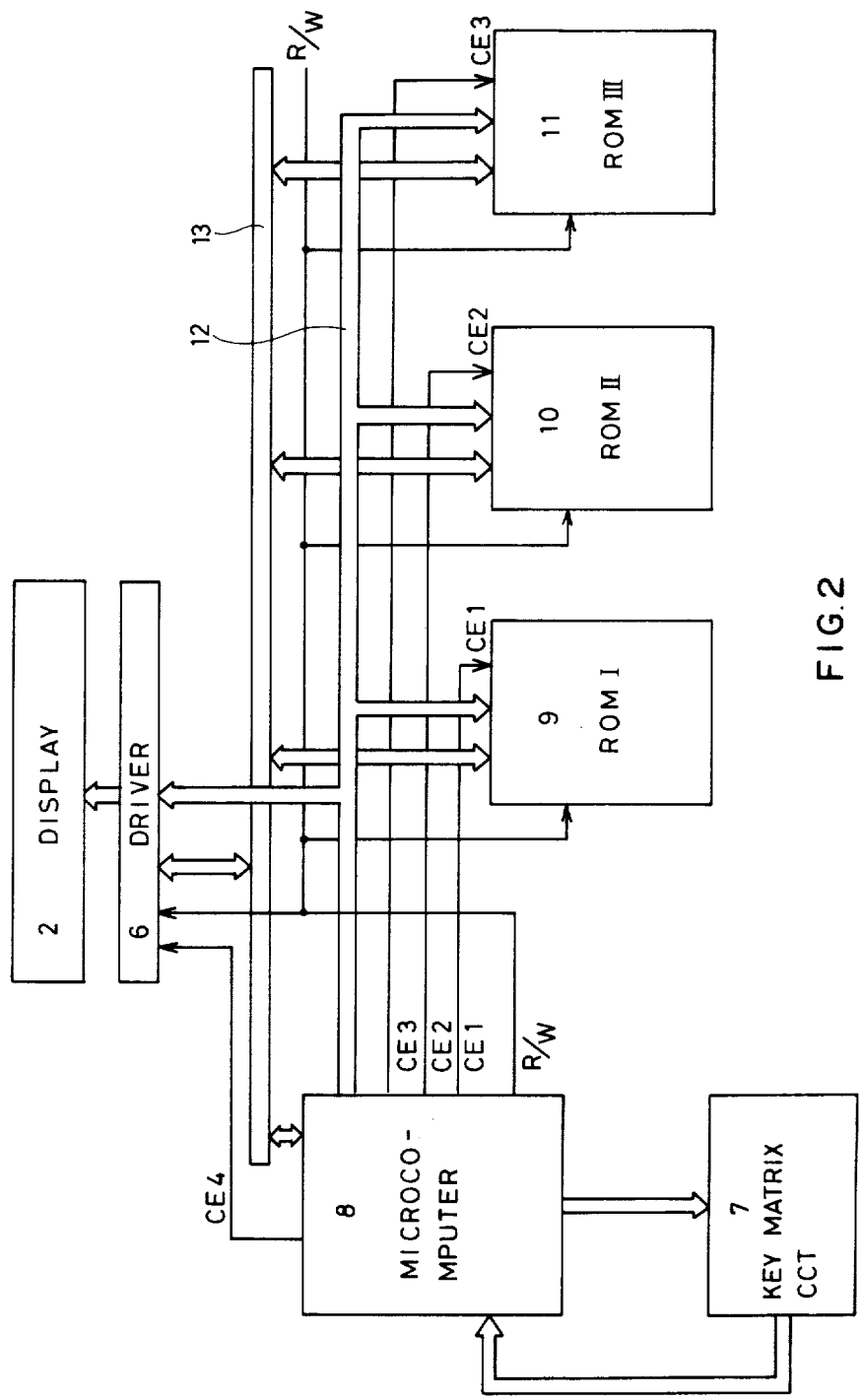
FIGS. 2, 3(a) and 3(b) show a block diagram of a control circuit that may be implemented within the translator as shown in FIG. 1.

A space key "SPC" is provided for spacing between inputted words. FIG. 2 shows a block diagram of a control circuit implemented in the translator according to the present invention. The circuit comprises the indicator 2, a driver 6, a key matrix circuit 7, a microcomputer 8, ROM I 9, ROM II 10, and ROM III 11. The circuit 7 functions with the keyboard 1 of FIG. 1. The circuit 7 is connected to terminals of the microcomputer 8 for developing key strobe signals and key input signals. Each of the ROMs 9 to 11 contains words and/or sentences used by the translator.

According to a preferred embodiment of the present invention, each one of the ROM's 9 to 11 corresponds to one language. For example, the ROM I 9 stores a plurality of English words, the ROM II 10 stores a number of Japanese words and the ROM III 11 stores a number of German words. Preferably, the ROM I 9 is built into the translator so that it can not be removed from the translator for exchange purposes. However, it is preferable that each of the ROM II 10 and the ROM III 11 can be removed from the translator and replaced by another type of ROM as module ① or ② to permit the user to translate between the mother language (here English) and additional foreign languages such as French (see FIG. 1).

Each of the ROM's 9 to 11 is connected to the microcomputer 8 through an address bus 12 and a data bus 13. Chip selection signals $CE_1$, $CE_2$ and $CE_3$ are developed by the microcomputer 8 to select one of the ROM's 9 to 11. Words and/or sentences are applied to the microcomputer 8 from the selected ROM. $CE_4$ indicates a chip selection signal for the driver 6. "R/W" indicates a read/write signal for selecting a read or write operation.

Figure 3A:
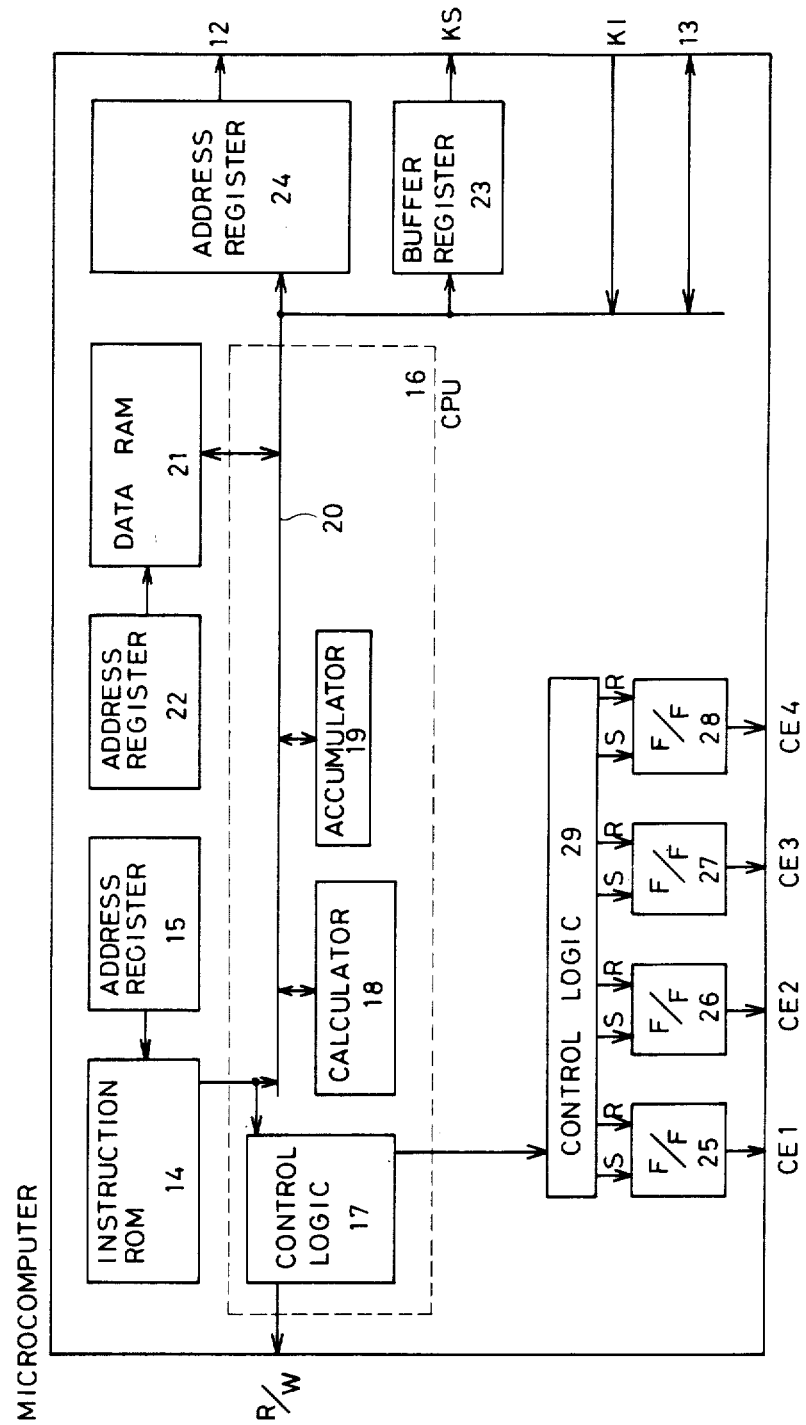

FIG. 3(a) shows a block diagram of the microcomputer 8 of FIG. 2. An instruction ROM 14 stores a number of kinds of instruction, each of which is used to perform a specific operation by the translator and is, preferably, in coded format. As the address of a ROM address register 15 is, in turn, advanced, the ROM 14 provides a specific instruction. The specific instruction is applied to a CPU 16 so that the CPU 16 understands its instruction to provide the selected operation.

The CPU 16 comprises a control logic 17, a logic calculator 18, and an accumulator 19. An internal data bus is indicated by the reference numeral 20. Data RAM 21 is provided for preliminarily containing data used for the translator and for functioning as a conditional flip-flop used for a branch in a program operation. Data from the CPU 16 is stored in a specific location within the data RAM 21 which location is selected by a RAM address register 22. The data stored in such a location within the RAM 21 is applied to the CPU 16.

Reference numeral 23 represents an output buffer register for outputting key strobe signals KS in turn to the key matrix circuit 7 so that the output of this circuit 7 is applied to the CPU 16 as key input signals KI. Reference numeral 24 indicates an address register for selecting the address of the external memory including the ROM's 9 to 11 and a RAM circuit within the driver 6. The output of the address register 24 is fed through the address bus 12. Control of the address register 24 to select increment or decrement and a certain address is carried out by the CPU 16. Since the CPU 16 is coupled to the data bus 13 as shown in FIG. 2, transmission of the data between the CPU 16 and the external memory is accomplished by use of the data bus 13. The direction of transmission of the data between them is defined with the read/write signal R/W.

Each of flip-flop circuits 25 to 28 is set or reset by a control logic 29. The control logic 29 is controlled by the CPU 16. The output of each of the flip-flops 25 to 28 is referred to as chip selection signals $CE_1$ to $CE_4$, respectively.

Figure 3B:
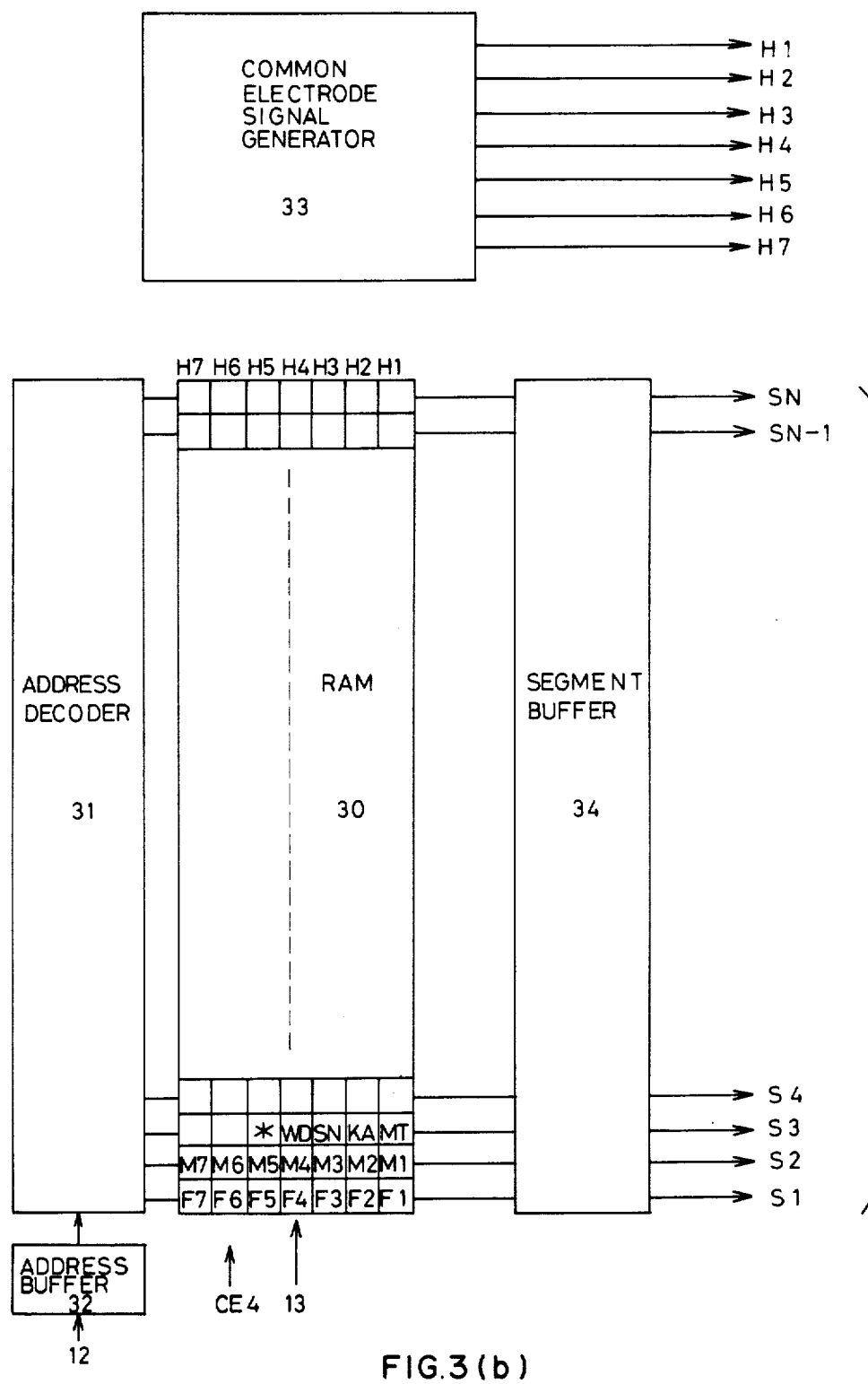

FIG. 3(b) shows a block diagram of the driver 6 of FIG. 2. According to a preferred embodiment of the present invention, the indicator 2 comprises a liquid crystal display. The character indicator 3 is formed as a 5×7 dot matrix in a single digit. One symbol of the language indicator 4 and the symbol indicator 5 is formed with a single digit.

The driver 6 comprises a RAM 30, an address decoder 31, an address buffer 32, a common electrode signal generator 33, and a segment buffer 34. Each bit of the RAM 30 corresponds to each dot (segment) of the indicator 2. That is, when information of "1" is written in a certain bit of the RAM 30, a particular dot (segment) of the indicator 2 corresponding to the certain bit is indicated. When information of "0" is stored in a certain bit of the RAM 30, a particular dot (segment) of the indicator 2 corresponding to the bit is made dark.

In FIG. 3(b), $S_1$, $S_2$ and $S_3$ refer to segment electrode signals used for illuminating symbols. $S_4$ to $S_N$ refer to segment electrode signals used for indicating characters. $H_1$ to $H_7$ represent common electrode signals. $M_1$ to $M_7$ represents a symbol "▲" of the language indicator 4, the symbol indicating the mother or original language which is to be translated with the translator of the present invention. $F_1$ to $F_7$ represent another symbol "▼" of the same indicator 4, this symbol indicating the foreign or the translated language into which the translator of the present invention translates a selected word or words from the original language.

Further in FIG. 3(b), numerals 1 to 7 when used as the suffixes are intended to refer to English, German, Japanese, French, etc., respectively. MT indicates a multivocal word, KA indicates a Japanese "Katakana" letter. SN represents a sentence while WD represents a word. A star "*" indicates that each of words represented in the mother or original language is translated into each of corresponding words represented in the foreign or translated language while the grammatical correction and modification meeting with that foreign language is not carried out.

The driver 6 provides display signals to the indicator 2 when display data is produced by the microcomputer 8 to apply them to the RAM 30. Since the driver 6 is of otherwise conventional design, further description thereof is omitted.

Figure 4:
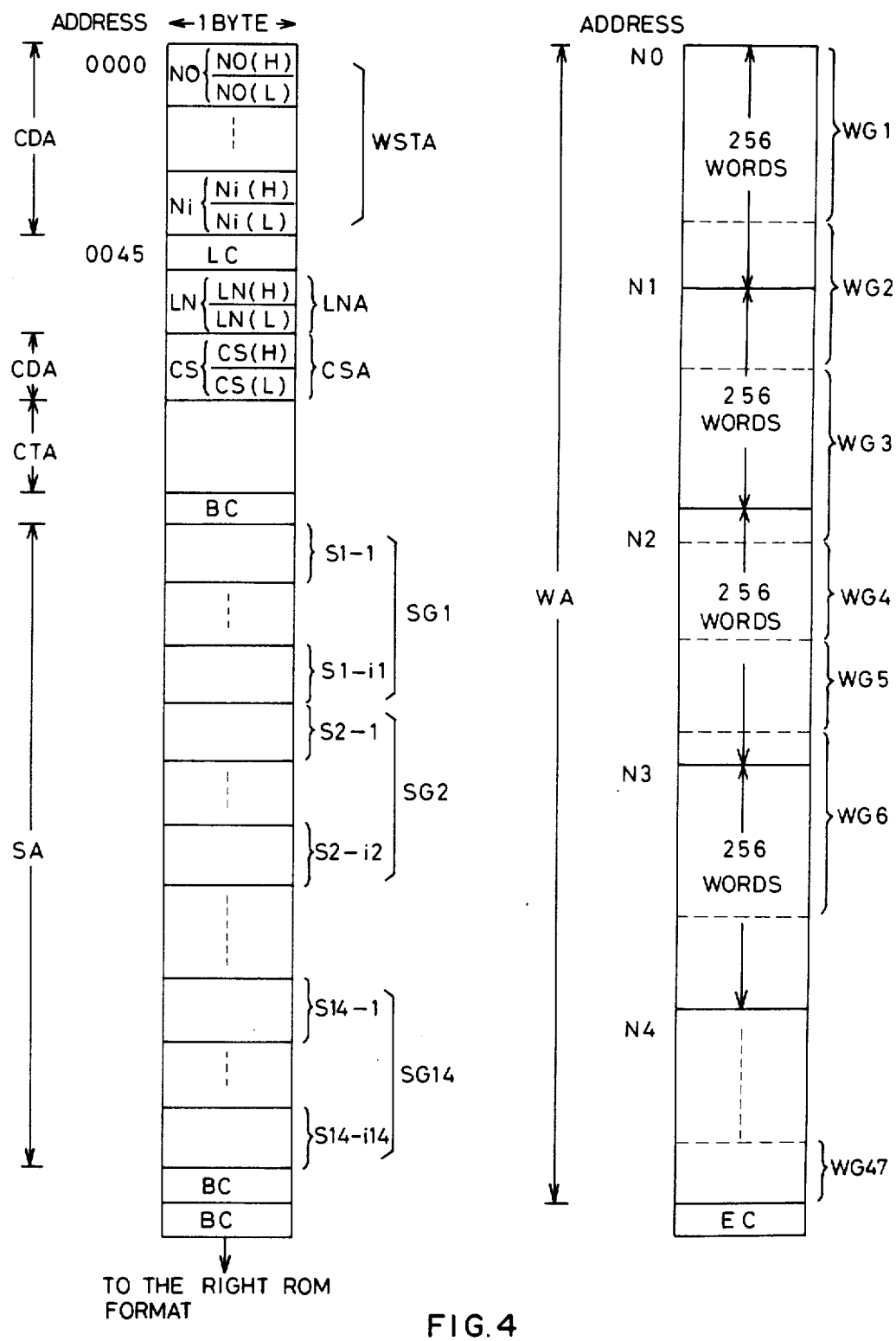
FIG. 4 shows a format of a ROM for storing words, the ROM being connectable to the circuit of FIG. 2.

FIG. 4 shows a format in which a great number of words are stored in each of the ROM's 9 to 11. This format contains a control data region CDA, a data-compression table CTA, a sentence data region SA and a word data region WA.

Each of the words is stored in the ROM such that its spelling is compressed. For example, in the ROM I 9, a pair of words "AN" is stored as a compressed code of 1 byte, $CC_1$. Another pair of words "BA" is stored as a compressed code of 1 byte, $CC_2$. Frequency in occurrence of spelling of English words is determined to detect those spellings having high frequency in occurrence. The thus selected English spelling is changed to corresponding compression codes for data storage purposes. The data-compression table CTA stores data for ascertaining the correspondence between the selected spellings and the compression codes.

When correspondence between an input word and one or words stored in one of the ROM's is to be detected, the input word is changed to codes inclusive of one of the compression codes according to the contents of the data-compression table CTA since each of the ROM's stores codes which may include one of the compression codes. The table CTA is used to show words stored in one of the ROM's by changing the codes to the original spelling. This table is different depending on the language to make the degree of data compression the greatest.

Stored words are classified in 47 categories in each of which a number of words are ordered. In FIG. 4, a word category "n" is referred to WGn. Sentences are formed by a combination of a plurality of stored words. These sentences are classified in 14 categories, in each of which a number of sentences are ordered. In FIG. 4, a sentence category "m" is referred to SGm containing a first sentence $S_{m-1}$ to a last sentence $S_{m-im}$. Each of the categories belonging to each of the word categories WG1 to WG14 corresponds to each of the sentence categories SG1 to SG14.

The following table shows the relationship between the serial number of the category and the name of the category.

TABLE 1-1

| The serial number of the category | corresponding key | the name of the category |
|---|---|---|
| 1 | "ra" or " ら " | airplane |
| 2 | "n" or "I" | customs |
| 3 | "ru" or "A" | transporting machine |
| 4 | "re" or "J" | at hotel |
| 5 | "ro" or "S" | in restaurant |
| 6 | "m" or "T" | sight seeing |
| 7 | "mo" or "U" | amusement |
| 8 | "ho" or "V" | shopping |
| 9 | "no" or "W" | direction |
| 10 | "to" or "X" | business |
| 11 | "so" or "Y" | service |
| 12 | "ko" or "Z" | conversation |
| 13 | "O" or "." | at medical practitioner's Office |
| 14 | "SPC" or "o" | emergency |

Each category for the words may contain 256 words. A first word address table region WSTA contains a first address referred to as $N_0, N_1, N_2, \ldots N_i$ in FIG. 4. This first address is related to a location in which a first code or first compressed code for representing the first word is stored. In accordance with a specific example of the present invention, each address is represented by two bytes. Each first address is separated into an upper byte referred to No(H) to Ni(H) and a lower byte referred to No(L) to Ni(L). The first word address table region is used to shorten retrieval time for a specific word.

CS is used to refer to a first sentence address CS(H) and CS(L) which is stored in a first sentence address region CSA. LNA indicates a memory location for storing a serial number of a word indicating the specific language as referenced by LN of LN(H) and LN(L). More particularly, as the ROM storing English words is concerned, a word "English" is necessarily contained in that ROM. In such a case, the serial number of the word "English" in the ROM is LN starting from the first word of the same kind of word group. Storing the serial number LN is suitable for showing the mother language and the foreign language being selected in the character indicator 3 because it is unnecessary to additionally store a word showing the language.

The translator of the present invention may comprise audible sound generating means for developing words represented in the mother language and/or the foreign language. Since such an audible sound generating means is disclosed in, for example, Hyatt, U.S. Pat. No. 4,060,848 issued Nov. 29, 1979, further description thereof is omitted.

In FIG. 4, LC indicates a language code in which the first four bits indicate a field of language stored in the ROM and the last four bits the kind of language stored in the ROM. In particular, there may be present a ROM for storing words oriented to economy, engineering or medicine, respectively. Information representing such a field is stored in LC. The last four bits correspond to each language as follows:

TABLE 1-2

| The last four bits | the language |
|---|---|
| 0 0 0 1 (1) | English |
| 0 0 1 0 (2) | German |
| 0 0 1 1 (3) | Japanese |
| 0 1 0 0 (4) | French |
| 0 1 0 1 (5) | a language |
| 0 1 1 0 (6) | another language |
| 0 1 1 1 (7) | a further language |

In FIG. 4, BC, "11111111" is a boundary code and EC "11111111" is an end code of the ROM.

The system of FIG. 2 has the capability of translating three languages from one to another. A specific type of ROM stores a great number of words and sentences as is shown in FIG. 4. Each of the stored words and sentences corresponds to a respective one of the words and translated sentences in the other ROM's. This correspondence is assured by the numbers of words and sentences which are in common between the ROM's. More particularly, a specific sentence "GOOD MORNING." is assumed to be stored as the 100th sentence in a ROM that stores data corresponding to English words and sentences.

The corresponding Japanese sentence is stored as the 100th sentence in another type of ROM that is related to Japanese. A further corresponding German translated sentence "GUTEN MORGEN." is stored similarly as the 100th sentence in a further type of ROM that is related to German.

Similarly, the same technique can be applied in connection with words so that a specific word ordered at a particular serial number in one ROM corresponds to its translated word ordered at the like serial number in another ROM.

Conducting the translation by the translator lies in finding the serial number of a word or a sentence in the mother language ROM and, accordingly thereafter, in detecting the translated word or sentence having the like serial number in the foreign language ROM.

The translation operation comprises the following steps:

(i) the first step: selecting a specific ROM of the mother language
(ii) the second step: detecting the serial number of a desired word or a sentence in the thus selected ROM;
(iii) the third step: selecting another specific ROM of the selected foreign language; and
(iv) the fourth step: detecting the translated word or sentence having the like serial number in the another ROM.

Figure 5:
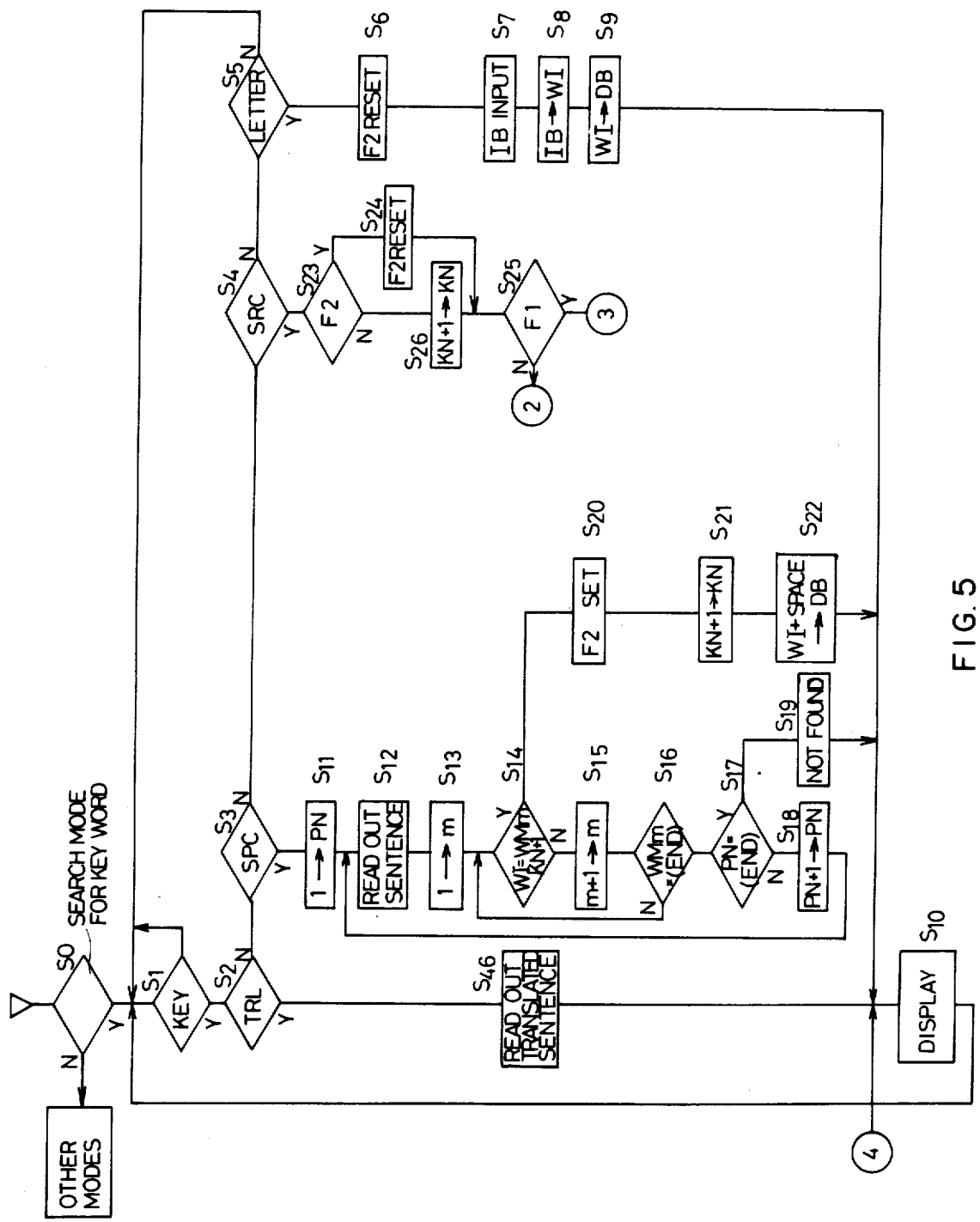
FIGS. 5 and 6 show a flowchart of a translator according to the present invention.
Figures 6, 7:
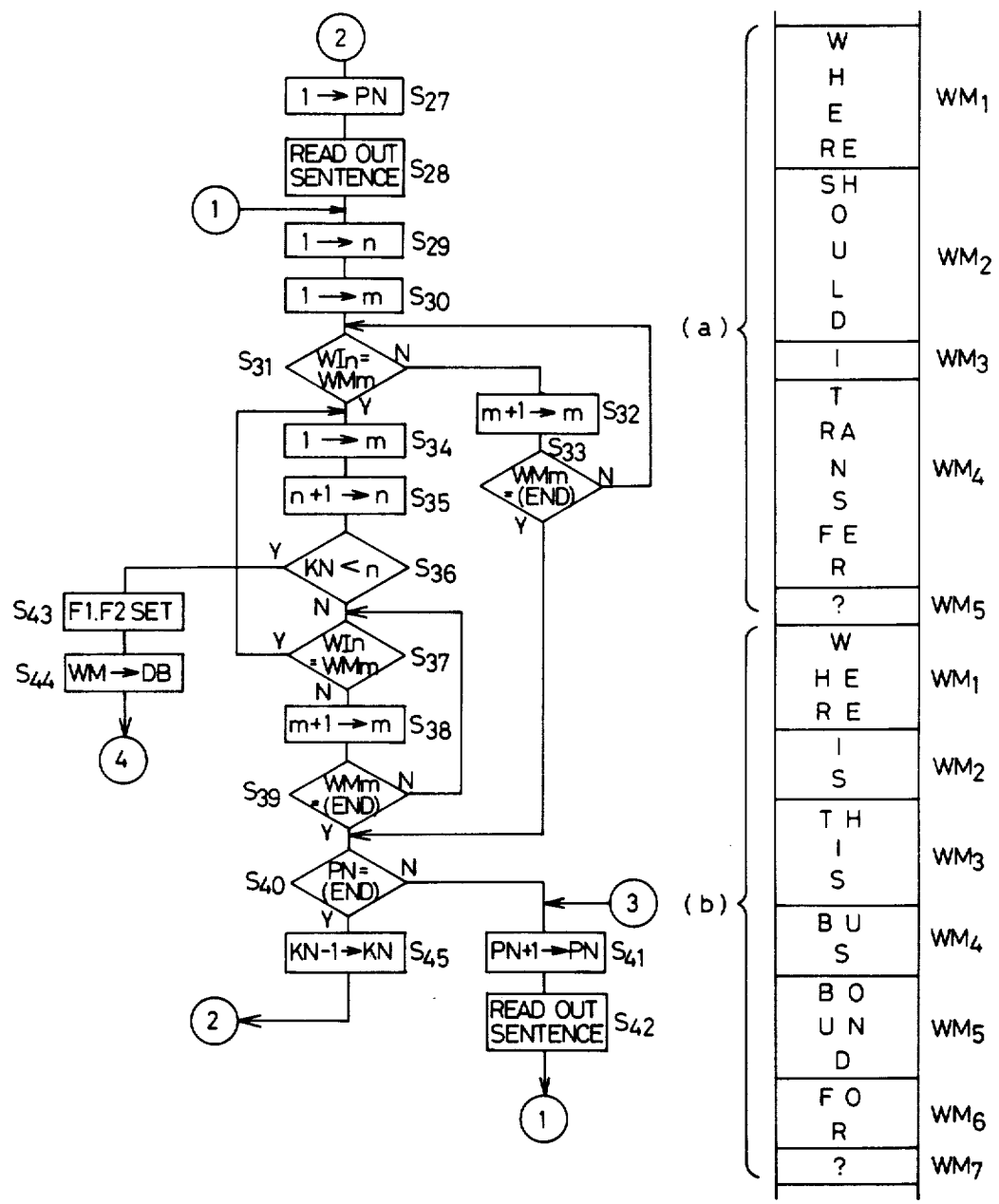
FIG. 7 shows the contents of sentence data in the ROM of FIG. 4.

FIGS. 5 and 6 show an operational flowchart of the translator according to the present invention.

In FIGS. 5 and 6, KN indicates a counter for counting the number of the key words that are inputted. IB indicates a buffer register for key inputted information. WI indicates a buffer register for storing the key words inputted. WM represents a buffer register for reading out and storing phrases, indioms and sentences retrieved from the ROM. PN represents a counter for storing the number of the phrases, the idioms and the sentences. DB represents a buffer register for enabling a display. "n" is a pointer for indicating the serial number of the key word in the buffer register WI.

"m" is a pointer for indicating the serial number of the phrases, idioms and sentences in the buffer WM. $F_1$ is a flag for indicating that any corresponding phrase, idiom or sentence is found in a key-word retrieval operation related to the present invention. $F_2$ is a flag for indicating that the space key "SPC" is actuated just before the search key "SRL" is actuated in the key-word retrieval operation.

According to a preferred embodiment of the present invention, the mother language is assumed to be English and the foreign language is assumed to be Japanese. When the mode selector 35 is placed in the key-word retrieval mode, a specific phrase, idiom or sentence is searched as follows.

The key-word retrieval operation which forms a basis of the present invention is described initially with reference to a case where first and second key words are inputted.

1. When a first key word inputted is part of some phrase, idiom or sentence, the following steps are executed:

(a) In $S_0 \rightarrow S_1 \rightarrow S_2 \rightarrow S_3 \rightarrow S_4 \rightarrow S_5$, a word "BUS" is key-inputted. In $S_5$, this information is related to a letter. $S_6$ is selected in which the flag $F_2$ is reset. In $S_7$, the word "BUS" is introduced into the buffer register IB. In $S_8$, this information is transferred from the buffer register IB into the buffer register WI. In $S_9$, the contents of the buffer register WI are transferred into the buffer register DB. In $S_{10}$, the word "BUS" is displayed in the character indicator 3.

(b) In $S_1 \rightarrow S_2 \rightarrow S_3$, the space key "SPC" is actuated. $S_3 \rightarrow S_{11}$ is then selected. In $S_{11}$, a "1" is applied to the counter PN. In $S_{12}$, a phrase, idiom or sentence having a serial number of "1" in a ROM is outputted. In $S_{13}$, the "1" is applied to the pointer m. In $S_{14}$, a first word $WM_1$ in the phrase, idiom or sentence outputted in $S_{12}$ is compared with a word $WI_{(KN+1)}$ which is key inputted (in this case, the word is a first word so that $WI_{(KN+1)} = WI_1$).

FIG. 7 shows the contents of exemplary sentence data stored in the ROM I 9 of FIG. 4. The phrases and the idioms can be stored in a format similar to that of FIG. 7. FIG. 7-(a) shows the contents of a sentence numbered as "1". FIG. 7-(b) shows the contents of the next sentence.

The sentence numbered as "1" contains four words, $WM_1$ to $WM_4$ and a question mark "?" in $WM_5$. $WM_1$ is "WHERE", which does not agree to $WI_1$ "BUS".

Therefore, $S_{15}$ is selected to cause m+1→m. In $S_{16}$, it is detected whether $WM_2$ is an end code indicating a period or a question mark. Since $WM_2$ "SHOULD" is not the end code, $S_{14}$ is reselected in which case $WI_1$ and $WM_2$ are compared. Thus, in a routine of $S_{14} \rightarrow S_{15} \rightarrow S_{16} \rightarrow S_{14} \rightarrow \ldots$, $WI_1$ and $WM_m$ are compared subsequently.

The sentence numbered as "1" does not contain the word "BUS". Therefore, $S_{16}$ is finally selected in which $WM_5$ is detected to be the end code. Then $S_{17}$ is selected in which it is detected whether the preceding sentence is the last one. When NO is detected in $S_{17}$, $S_{18}$ is selected in which the counter PN is incremented by 1 to select the next sentence (or a next phrase or idiom). $S_{12}$ is reselected so that the next sentence is outputted. In $S_{13}$, the pointer m is reset to be 1, and the routine of $S_{14} \rightarrow S_{15} \rightarrow S_{16} \rightarrow S_{14} \ldots$ is executed. When m=4, it is detected that $WI_1 = WM_4$. As shown in FIG. 7-(b), $WM_4$ is "BUS".

In this manner, it is detected whether the word "BUS" is part of any stored sentence (or any phrase or idiom). In $S_{20}$, the flag $F_2$ is set. In $S_{21}$, KN+1→KN is executed. In $S_{22}$, a space is placed after the word "BUS". In $S_{10}$, "BUS⊔" ("⊔" means a space) is displayed in the character display 3. Continuously, the key-word retrieval operation can be conducted by inputting any key word.

2. When a second key word (a false key word) inputted is not part of any phrase, idiom or sentence, the following steps are executed:

Following the operation described in item 1 above, a word "BOUNDS" is key-inputted in $S_1 \rightarrow S_2 \rightarrow S_3 \rightarrow S_4 \rightarrow S_5$. The operation of item 1-(a) follows to read in the key-inputted information. The word "BOUNDS" is named as $WI_2$. After the space key "SPC" is actuated, $WI_2$ is compared subsequently with $WM_m$. Since the word "BOUNDS" is not contained within any sentence (or any phrase or idiom), $S_{17}$ is finally selected so that the contents of the counter PN are compared with the end code to detect their agreement. In $S_{19}$, a "not-found" operation is executed in which the word "BOUNDS" is canceled from the buffer registers WI and DB and, instead, a symbol of ". . . ", "!!" or the like for indicating that the word "BOUNDS" is not part of any phrase, idiom or sentence is applied to the buffer register DB. Continuously, the key-word retrieval operation can be conducted by inputting any key word. In $S_{10}$, "Bus ⊔. . . ⊔" is displayed to indicate that the word "BOUNDS" is not part of any sentence (or any phrase or idiom).

Now, the key-word retrieval operation according to the present invention in which a second true key word is inputted will be described, 3. When a third key word (a second true key word) is inputted, the following steps are executed:

General Operation:

Following the operation described in items 1 and 2 above, a second key word, "BOUND" is key-inputted in $S_1 \rightarrow S_2 \rightarrow S_3 \rightarrow S_4 \rightarrow S_5$. The operation of item 1 follows. The word "BOUND" is named also as $WI_2$. After the space key "SPC" is operated, PN=2 and m=5 are detected so that $WI_2=WM_5$ is discriminated in $S_{14}$, $WM_5$ being shown in FIG. 7-(b). In $S_{10}$, "BUS ⊔ ... ⊔ BOUND ⊔" is displayed, finally.

(a) The search key "SRC" is operated in $S_1 \rightarrow S_2 \rightarrow S_3 \rightarrow S_4$. $S_4 \rightarrow S_{23} \rightarrow S_{24}$ are selected. In $S_{24}$, the flag $F_2$ is reset. Since the flag $F_1$ is in a rest condition in $S_{25}$, ② of FIG. 6 is selected. ② of FIG. 6 is operated to search for a sentence (or a phrase or idiom) on the basis of the word "BOUND".

In $S_{27}$, the counter PN is incremented by 1. In $S_{28}$, the sentence numbered as "1" is outputted. In $S_{29}$, "1" is applied to the pointer n and in $S_{30}$, "1" is applied to the pointer m. In $S_{31}$, a first word $WM_1$ in the sentence outputted in $S_{28}$ is compared in $S_{31}$ with the word "BUS" named as $WI_1$. As seen in FIG. 7-(a), $WM_1$ is "WHERE" so that it does not agree to $WI_1$. Therefore, the routine of $S_{31} \rightarrow S_{32} \rightarrow S_{33} \rightarrow S_{31}$ ... is effected so that $WI_1$ and $WM_m$ are compared.

FIG. 7-(a) does not contain the word "BUS". Then, finally, $WM_5$ is determined to be the end code in $S_{33}$. $S_{40}$ is selected in which it is detected whether the sentence of FIG. 7-(a) is the last one. When NO is detected, $S_{41}$ is selected in which the counter PN is incremented by 1 to access the next sentence. In $S_{42}$, the next sentence is outputted, so that ① is selected. $S_{29}$ is reselected. In $S_{30}$, the pointer m is set in 1. The routine of $S_{31} \rightarrow S_{32} \rightarrow S_{33} \rightarrow S_{31}$ ... is conducted. When m=4, $WI_1=WM_4$ is detected because $WM_4$ is "BUS" as shown in FIG. 7-(b).

In $S_{34}$, 1 is applied to the pointer m. In $S_{35}$, n+1→n is held so that the pointer n has 2. In $S_{36}$, KN<n is detected. As KN=2, NO is answered. In $S_{37}$, $WI_2$ and $WM_1$ are compared. Since $WI_2$ is "BOUND" and $WM_1$ is "WHERE" as seen in FIG. 7-(b), NO is answered. $S_{38}$ is selected to add 1 to the pointer m. In $S_{39}$, it is detected whether $WM_2$ is the end code or not. NO is answered in $S_{39}$ so that $S_{37}$ is selected for comparison.

Thus, the routine of $S_{37} \rightarrow S_{38} \rightarrow S_{39} \rightarrow S_{37}$ ... is selected. When m=5, it is detected whether $WI_2=WM_5$ or not. In $S_{34}$, 1 is admitted into the pointer m. $S_{35}$ is selected to cause n+1→n so that n=3. $S_{36}$ is selected whether KN<n or not. Since KN=2, YES is answered in $S_{36}$. In $S_{43}$, the flags $F_1$ and $F_2$ are set. $S_{44}$ is selected to transfer the contents of the sentence numbered as 2 into the display buffer DB. ④ of FIG. 5 is selected to display the following sentence:

WHERE IS THIS BUS BOUND FOR?

(b) The operator can know whether the displayed sentence is one to be sought by him or not. When not, he further actuates the search key "SRC". In response to actuation of this key, $S_4 \rightarrow S_{23}$ are selected. Since the flag $F_2$ is placed in a set condition, YES is answered in $S_{23}$ to select $S_{24} \rightarrow S_{25}$. Since the flag $F_1$ is placed in a set condition, $S_{25} \rightarrow$ ③ are selected. $S_{41} \rightarrow S_{42}$ are selected so that the number of the sentence begins from 3. The above retrieval operation is repeated.

(c) When a sentence to be sought by the operator is displayed, he can translate it by actuating the translation key "TRL". In response to actuation of this key, $S_1 \rightarrow S_2 \rightarrow S_{46} \rightarrow S_{10}$ are selected so that the contents of the counter PN, namely, a translated sentence, in Japanese, corresponding to the number of the mother sentence is retrieved and displayed.

(d) When no sentence (or a phrase or idiom) containing the words "BUS" and "BOUND" is present, $S_{40}$ is selected so that it is detected that the last sentence (phrase or idiom) is subjected to retrieval. $S_{45}$ is selected in which 1 is subtracted from the counter KN. The operation of the case of KN=1 is repeated so that any sentence (a phrase or idiom) having a single key word of "BUS" or "BOUND" is retrieved.

As stated above, according to the present invention, a false key word is detected promptly after the false key word is inputted. As such, the detection of a false or a true key word is enabled each time that a key word is inputted in the electronic translator.

While only certain embodiments of the present invention have been described and shown herein, it will be apparent to those skilled in the art that various changes and modifications may be made therein without departing from the spirit and scope of the invention as claimed.

What is claimed is:

1. An improved electronic translator wherein an arrangement of words in a source language is retrieved from a memory contained therein along with a translation of said arrangement of words in a target language different from said source language, said translator comprising:

input means for serially entering two or more key words thought by a user to be contained within at least one stored arrangement of words in said source language;

memory means for storing a plurality of stored arrangements of words in said source language and an associated plurality of stored arrangement of words in said target language, each one of said plurality of stored arrangements of words in said source language being associated with its translation as a stored arrangement of words in said target language;

access means, responsive to said input means, for searching the plurality of stored arrangements of words in said source language to locate a word therein corresponding to a said key word;

termination means, responsive to the completed entry of each one of said two or more key words by said input means, for indicating that said entry of each said key word is completed and for immediately enabling said access means to search said plurality of stored arrangements of words to identify a word therein corresponding to said key word before a succeeding said key word is entered;

said access means, upon entry of two or more key words contained within said memory means as determined by the search of said access means enabled by said translation means, recalling from said memory means a said stored arrangement of words in said source language containing said two or more key words entered into said input means as a selected source arrangement and recalling its said translation as selected translation arrangement, and means, responsive to the recall of said selected source arrangement and said selected translation sentence by said access means, for indicating said selected source arrangement and said selected translation arrangement to the user of said translator.

2. The translator of claim 1 wherein said means for indicating comprises a visual display.

3. The translator of claim 1 wherein said access means recalls said selected translation arrangement and said means for indicating indicates said selected translation arrangement to the user of said translator subsequent to the recalling of said selected source arrangement by said access means and the indicating of said selected source arrangement by said means for indicating.

4. The translator of claim 3 wherein said means for indicating comprises a visual display.

5. The translator of claim 1 wherein said memory means comprises a first memory portion for storing said stored arrangements of words in said source language and a second memory portion for storing said stored arrangements of words in said target language; each one of said plurality of stored arrangements of words in said source language and its associated said translation arrangement in said target language being located at the same addresses in said first and second memory portions, respectively.

6. The translator of claim 1 wherein said access means, upon unsuccessfully completing the search of said plurality of stored arrangements of words in said source language for said key word, develops a not found output;

means, responsive to said not found output of said access means, for driving said means for indicating to indicate to the user of said translator that the said keyword has been located.

* * * * *